(12) United States Patent  
An

(10) Patent No.: US 8,591,363 B2  
(45) Date of Patent: Nov. 26, 2013

(54) TRANSMISSION AND TRACTION MOTOR MODULE USING THE SAME

(75) Inventor: Sunghwan An, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/483,586

(22) Filed: May 30, 2012

(65) Prior Publication Data

US 2013/0040774 A1 Feb. 14, 2013

(30) Foreign Application Priority Data

Aug. 9, 2011 (KR) .................. 10-2011-0079165  
Sep. 6, 2011 (KR) .................. 10-2011-0090037

(51) Int. Cl.  
*F16H 48/00* (2012.01)

(52) U.S. Cl.  
USPC ............................................. 475/12

(58) Field of Classification Search  
None  
See application file for complete search history.

(56) References Cited

U.S. PATENT DOCUMENTS

| | | | | |
|---|---|---|---|---|
| 4,479,404 A * | 10/1984 | Stockton | ........... | 475/149 |
| 5,378,210 A * | 1/1995 | Teraoka | ........... | 475/312 |
| 5,397,282 A * | 3/1995 | Weidman | ........... | 475/205 |
| 8,226,517 B2 * | 7/2012 | Tsai et al. | ........... | 475/149 |
| 8,449,421 B2 * | 5/2013 | Jung et al. | ........... | 475/12 |
| 2013/0023371 A1 * | 1/2013 | Yun | ........... | 475/149 |

* cited by examiner

*Primary Examiner* — Dirk Wright  
(74) *Attorney, Agent, or Firm* — Saliwanchik, Lloyd & Eisenschenk

(57) ABSTRACT

Provided is a transmission of an e-bike motor, the transmission including a plurality of planetary gears meshed with a sun gear transmitting a power of a rotation shaft of a motor, a ring gear including a gear member meshed with an inner circumferential surface of the planetary gears and a clutch member formed at the other end of the gear member to shift a direction of power in response to backward and forward rotations, where the gear member and the clutch member are individual parts, and a connection unit connecting the gear member and the clutch member lest the gear member and the clutch member idle relative to an axial direction, wherein the plurality of planetary gears and the gear member of ring gear are provided in helical gears.

18 Claims, 11 Drawing Sheets

TRANSMISSION AND TRACTION MOTOR MODULE USING THE SAME

CROSS-REFERENCE TO RELATED APPLICATIONS

This application claims the benefit under 35 U.S.C. §119 of Korean Patent Applications No. 10-2011-0079165, filed Aug. 9, 2011 and 10-2011-0090037, filed Sep. 6, 2011, which are hereby incorporated by reference in their entirety.

BACKGROUND

1. Field of Endeavor

The present disclosure relates to a transmission and a traction motor module using the same.

2. Background

The pedal cycle may be, for example, a conventional pedal cycle in which drive is only ever provided by a cyclist applying force to the pedals thereof, such cycles sometimes being referred to as "push bikes".

Recently, the pedal cycle has evolved to, for example, a pedelec, an EAPC (electrically-assisted pedal cycle) an electric bicycle or an e-bike. The electrically-assisted pedal cycle (EAPC) or an e-bike is operated by a motor in such a manner that electrical power is used to assist the efforts of a cyclist pedaling the cycle.

Several methods of arranging a motor have been attempted and a recent method is to embed a motor and a transmission inside a hub forming a front wheel or a rear wheel. The hub is integrally formed with the motor and the transmission therein. An example of this type of e-bike motor is disclosed by the Korean Patent Registration No.: 10-1055022 filed on Aug. 5, 2011.

The hub includes a housing and a stationary shaft. The motor is arranged inside the hub housing, and the stationary shaft is fixed to a front wheel or a rear wheel of a frame of an e-bike or an e-scooter. As a result, the hub housing is rotated relative to the stationary shaft to rotate a wheel of the bike coupled to the hub housing.

The motor is housed inside the hub housing to rotate a rotation shaft by means of electromagnetic interaction. The motor housing of the motor is fixed relative to the hub housing, and a rotation shaft rotatably arranged in the center of the motor housing transmits a turning effect to a sun gear integrally formed with a distal end thereof, whereby a power is supplied to a transmission including the sun gear.

The transmission is provided with a plurality of planetary gears meshed with the sun gear and a ring gear arranged at a margin of the transmission to mesh with the planetary gears, whereby the transmission receives the turning effect of the rotation shaft in a reduced speed.

Meanwhile, the other surface of an inner circumferential surface meshed with planetary gears of the ring gear is provided with a clutch member for enablement of gear transmission, where the clutch member is integrally formed at a surface opposite to the gear member meshed with the plurality of planetary gears for double clutch transmission through forward and backward rotations.

The ring gear integrally formed with the gear member and the clutch member is manufactured through cold forging or hot forging process, such that problems arise in that the gear member is manufactured as a spur gear to create noise and push up the manufacturing cost, and no other engineering processes can produce the ring member.

BRIEF SUMMARY

The present disclosure has been made to solve the foregoing problems of the prior art and therefore an object of certain embodiments of the present invention is to provide a traction motor module configured to reduce the number of assembly parts and assembling processes, and manufacturing cost by improving a structure of a clutch included in a transmission changing a rotation speed of a hub unit encompassing a traction motor.

Another object is to provide a transmission of an e-bike motor improved in structure by changing a conventional ring gear-shaped spur gear to a helical gear that generates less noise over the spur gear.

In one general aspect of the present disclosure, there is provided a transmission of an e-bike motor, the transmission comprising: a plurality of planetary gears meshed with a sun gear transmitting a power of a rotation shaft of a motor; a ring gear including a gear member meshed with an inner circumferential surface of the planetary gears and a clutch member formed at the other end of the gear member to shift a direction of power in response to backward and forward rotations, where the gear member and the clutch member are individual parts; and a connection unit connecting the gear member and the clutch member lest the gear member and the clutch member idle relative to an axial direction, wherein the plurality of planetary gears and the gear member of ring gear are provided in helical gears.

Preferably, but not necessarily, the connection unit includes a plurality of accommodation grooves formed at an inner circumferential surface of a connector of the clutch member at the gear member; and accommodation lugs circumferentially and protrusively formed at a periphery of a connector of the gear member at the clutch member to be coupled to the accommodation grooves, wherein the accommodation grooves and the accommodation lugs are press-fitted.

Preferably, but not necessarily, the accommodation lug is protrusively formed at a periphery of a ring-shaped plate member extensively formed to a circumferential direction of the clutch member.

Preferably, but not necessarily, the accommodation grooves and the accommodation lugs are such that inner angles of imaginary lines connected to a center of the ring gear are perpendicularly arranged.

Preferably, but not necessarily, the connection unit includes a ring-shaped support plate member extensively formed on an inner circumferential surface of the connector of the clutch member at the gear member to have a diameter corresponding to that of an inner diameter of the clutch member, insertion holes penetratively formed at the support plate, a plurality of insertion lugs integrally formed at the clutch member to be insertedly coupled to the insertion hole, wherein the insertion holes and the insertion lugs are coupled by press-fitting method.

Preferably, but not necessarily, the insertion lug is protrusively formed to an insertion direction on a surface opposite to the gear member of the ring-shaped plate member extensively formed to a circumferential direction of the clutch member.

Preferably, but not necessarily, the support plate member and the plate member are surface-contacted to each other.

Preferably, but not necessarily, the insertion holes and the insertion lugs are such that inner angles of imaginary lines connected to a center of the ring gear are perpendicularly arranged.

Preferably, but not necessarily, the ring gear is formed by any one of steel, plastic and sinter.

In another general aspect of the present disclosure, there is provided a traction motor module, the module comprising: a motor unit including a rotation shaft rotating forward and backward; a hub unit encompassing the motor unit and rotating relative to the motor unit; a first transmission unit including a first ring gear rotated by a power transmitted by the rotation shaft; a second transmission unit secured to the hub unit and including a second ring gear further including a low speed ring gear and a high speed ring gear; and a clutch including the first ring gear rotating in a forward direction, a first clutch connecting the first ring gear and the low speed ring gear, and a second clutch connecting the first ring gear and the high speed ring gear through a backward rotation, wherein the clutch is formed with a length shorter than circumferential lengths of the first and second ring gears.

Preferably, but not necessarily, the clutch is formed in the shape of an arc based on each center of the first and second ring gears, when viewed in a top plan view.

Preferably, but not necessarily, the clutch is formed with a 90° of angle when viewed in a top plan view.

Preferably, but not necessarily, at least two clutches are coupled in series.

Preferably, but not necessarily, a coupling groove is formed at each lateral surface of first and second clutches, and the other lateral surface opposite to the each lateral surface of the first and second clutches is formed with a lug coupled to the coupling groove.

Preferably, but not necessarily, each of the first and second clutches includes a curved lateral plate having a same curvature, a pin fixing hole formed at each lateral plate, a power transmission pin inserted into the pin fixing hole and a pin stopper inhibiting the power transmission pin from separating.

Preferably, but not necessarily, three power transmission pins are formed at the lateral plate.

Preferably, but not necessarily, the first transmission unit includes a sun gear coupled to the rotation shaft, a plurality of planetary gears coupled to the sun gear and inscribed to the first ring gear, and a connection member formed at the first ring gear and connected to the clutch.

Preferably, but not necessarily, the low speed ring gear of the second transmission unit is formed with a first diameter, and the high speed ring gear is formed with a second diameter smaller than the first diameter, and the second transmission unit includes a first idle gear coupled to the first clutch, a second idle gear coupled to the first idle gear and the high speed ring gear, and an axle inserted by the first and second idle gears.

The transmission according to the present disclosure has an advantageous effect in that a ring gear forming the transmission is formed in a bipartite structure to enable a shape of a gear member of ring gear to be manufactured in that of a helical gear, whereby life can be prolonged over that of the conventional motor and an operational noise caused by gear mesh can be reduced.

The transmission according to the present disclosure has an advantageous effect in that the conventional structure manufactured with steel only can be manufactured with plastic or sinter, whereby life can be prolonged over that of the conventional motor, and a manufacturing cost of parts can be reduced and productivity can be also increased.

The traction motor module using a transmission according to the present disclosure has an advantageous effect in that a clutch included in the transmission changing a rotation speed of a hub unit is changed from a shape of a round band to that of an arc to reduce the number of power transmission pins that is a constituent part of the clutch and to reduce lengths of first and second clutches supporting the power transmission pins, whereby the number of parts and processes for assembly of clutch can be reduced to greatly reduce the manufacturing cost.

BRIEF DESCRIPTION OF THE DRAWINGS

The drawing figures depict one or more implementations in accord with the present concepts, by way of example only, not by way of limitations. In the figures, like reference numerals refer to the same or similar elements.

The accompanying drawings, which are included to provide a further understanding of the disclosure and are incorporated in and constitute a part of this application, also illustrate embodiment(s) of the disclosure, and together with the description serve to explain the principle of the disclosure. In the drawings.

DETAILED DESCRIPTION

Figure 1:
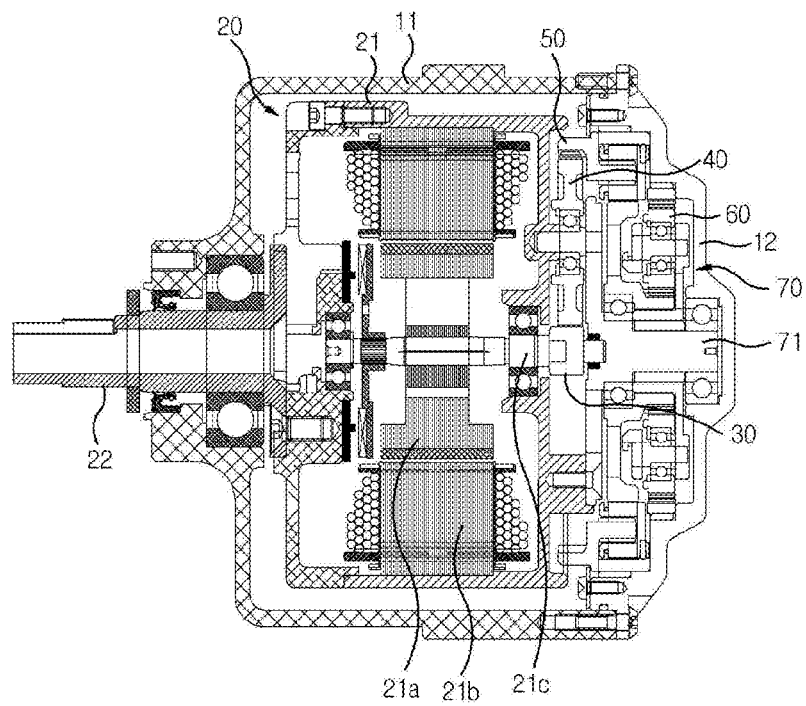
FIG. 1 is a lateral cross-sectional view illustrating a general structure of an e-bike motor according to the present disclosure.

The disclosed embodiments and advantages thereof are best understood by referring to FIGS. 1-13 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first", "second", and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted.

Hereinafter, a planetary gear train for transmission of e-bike motor according to exemplary embodiments of the present disclosure will be described in detail with reference to the accompanying drawings.

FIG. 1 is a lateral cross-sectional view illustrating a general structure of an e-bike motor according to the present disclosure.

Referring to FIG. 1, an e-bike motor includes a transmission including a hub housing (11), a motor (20), a sun gear (30), a planetary gear (40) and a ring gear (50).

The hub housing (11) takes an approximately cylindrical shape, and is arranged at a center axis of a front wheel or a rear wheel of the bike. The hub housing (11) may be arranged at a periphery with a bike wheel member (not shown), or may be coupled to a hub housing accommodation groove formed at an inner wheel of bike wheel.

Meanwhile, the hub housing (11) is centrally formed with a fixing shaft (22). The fixing shaft (22) is fixed at a front wheel or a rear wheel side of a frame of an e-bike or an e-scooter. Thus, the hub housing (11) is rotated relative to the fixing shaft (22) to rotate the wheel of the bike coupled to the hub housing (11).

The motor (20) is concentrically mounted with the fixing shaft (22) inside the hub housing (11). The motor (20) includes a rotor (21a) and a stator (21b), and the rotor (21a) is centrally mounted with a rotation shaft (21 c). The rotation shaft (21 c) is concentrically mounted with the fixing shaft (22), and is mounted at a distal end with a sun gear (30).

The sun gear (30) rotates by receiving a turning effect of the rotation shaft (21c) generated by interaction of the rotor (21a) mounted inside the motor housing (21) and the stator (21b).

A planetary gear (40) is meshed with the sun gear (30) to rotate in association with rotation of the sun gear (30). At least three planetary gears (40) are provided, and a periphery of the planetary gear (40) is meshed by a ring gear (50). The ring gear (50) is rotated in association with rotation of the planetary gears (40). The ring gear (50) is arranged at a periphery with a transmission ring gear (60), where the transmission ring gear (60) is rotated by being coupled to a hub cover (12) forming an exterior look of a distal end of the hub housing (11).

A connection member is interposed between the ring gear (50) and the transmission ring gear (60) to directly transmit or block a turning effect in response to a rotation direction.

For example, the rotation of the ring gear (50) is directly transmitted to the ring gear (6) by the connection member, in case of rotation to one direction of the rotation shaft, and the housing is rotated by rotation of the hub gear (12) coupled to the transmission ring gear (60).

Meantime, in case of rotation to the other direction of the rotation shaft, the direct transfer of the turning effect to the transmission ring gear (60) of the ring gear (50) is blocked, and change and transfer of rotation direction is performed by a planetary gear module (70) concentrically supported by a stator shaft (71) via the connection member to rotate the transmission ring gear (60) to a direction.

The present disclosure is characterized by the fact that the ring gear (50) is manufactured in a bipartite structure to allow a gear forming unit of the ring gear (50) to be manufactured in a helical gear.

Figure 2:
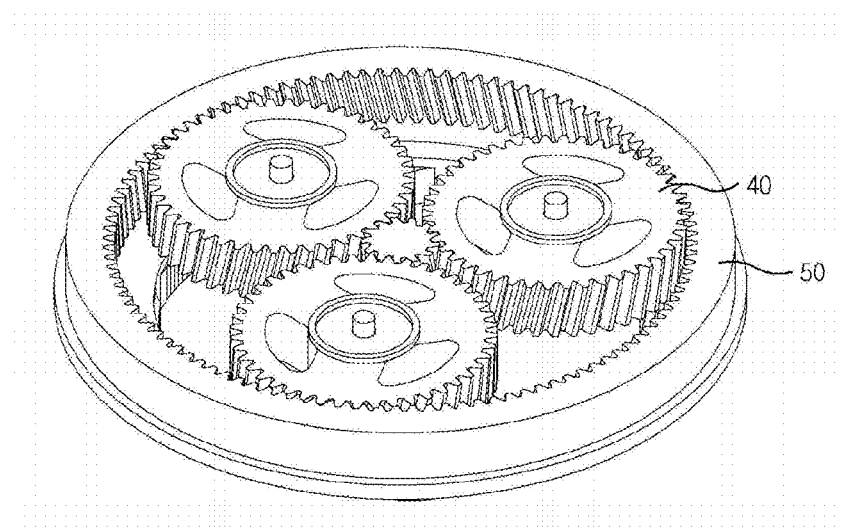
FIG. 2 is a perspective view of a planetary gear and a ring gear of FIG. 1.
Figure 3:
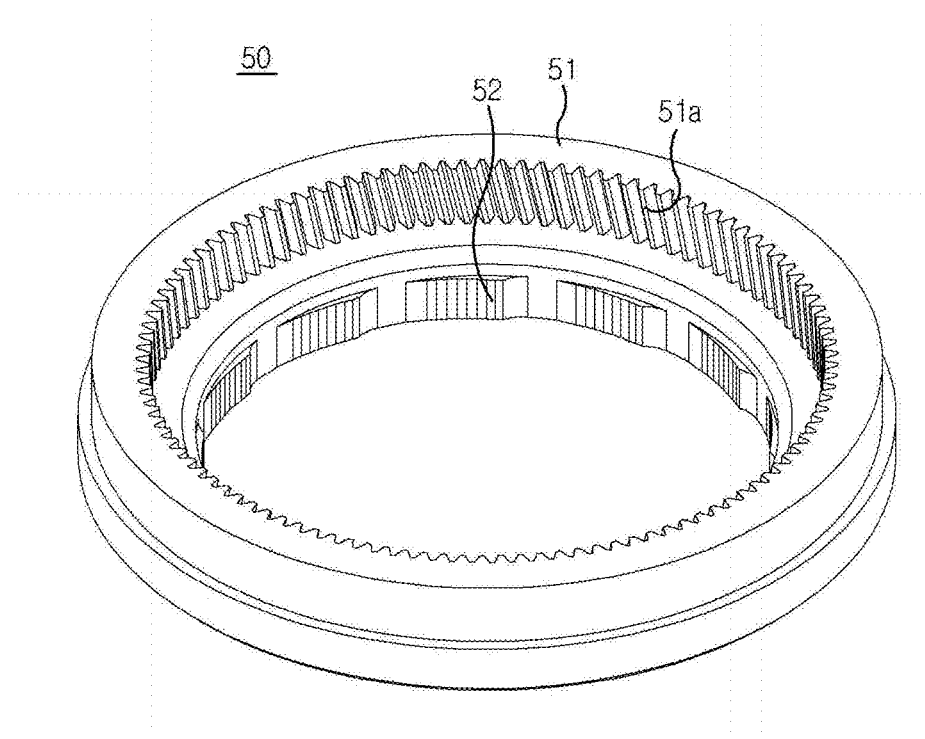
FIGS. 3 and 4 are perspective views illustrating only a ring gear extracted from FIG. 2.
Figure 4:
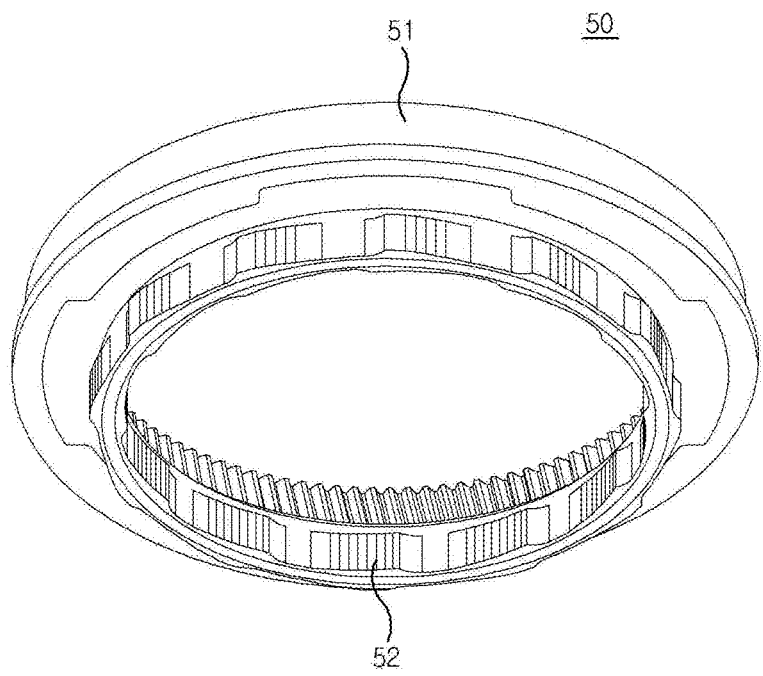

FIG. 2 is a perspective view of a planetary gear and a ring gear of FIG. 1, and FIGS. 3 and 4 are perspective views illustrating only a ring gear extracted from FIG. 2.

Referring to FIG. 2, a gear shape of each of the three planetary gears is provided in that of a helical gear, and as illustrated in FIG. 3, a gear surface (51a) of the ring gear (50) meshed with the planetary gears (40) is also provided in the shape of a helical gear.

Figure 5:
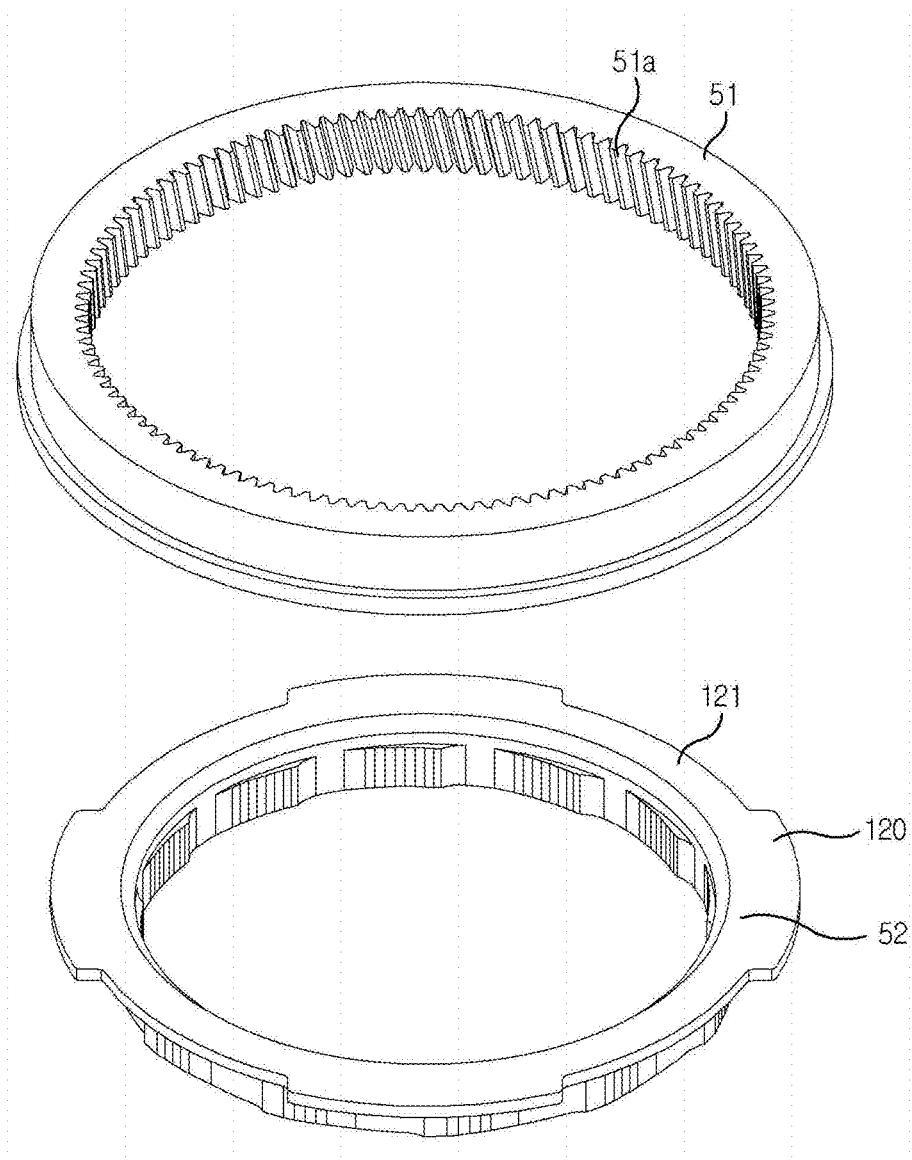
FIGS. 5 and 6 are exploded perspective views of ring gear according to a first exemplary embodiment of the present disclosure.
Figure 6:
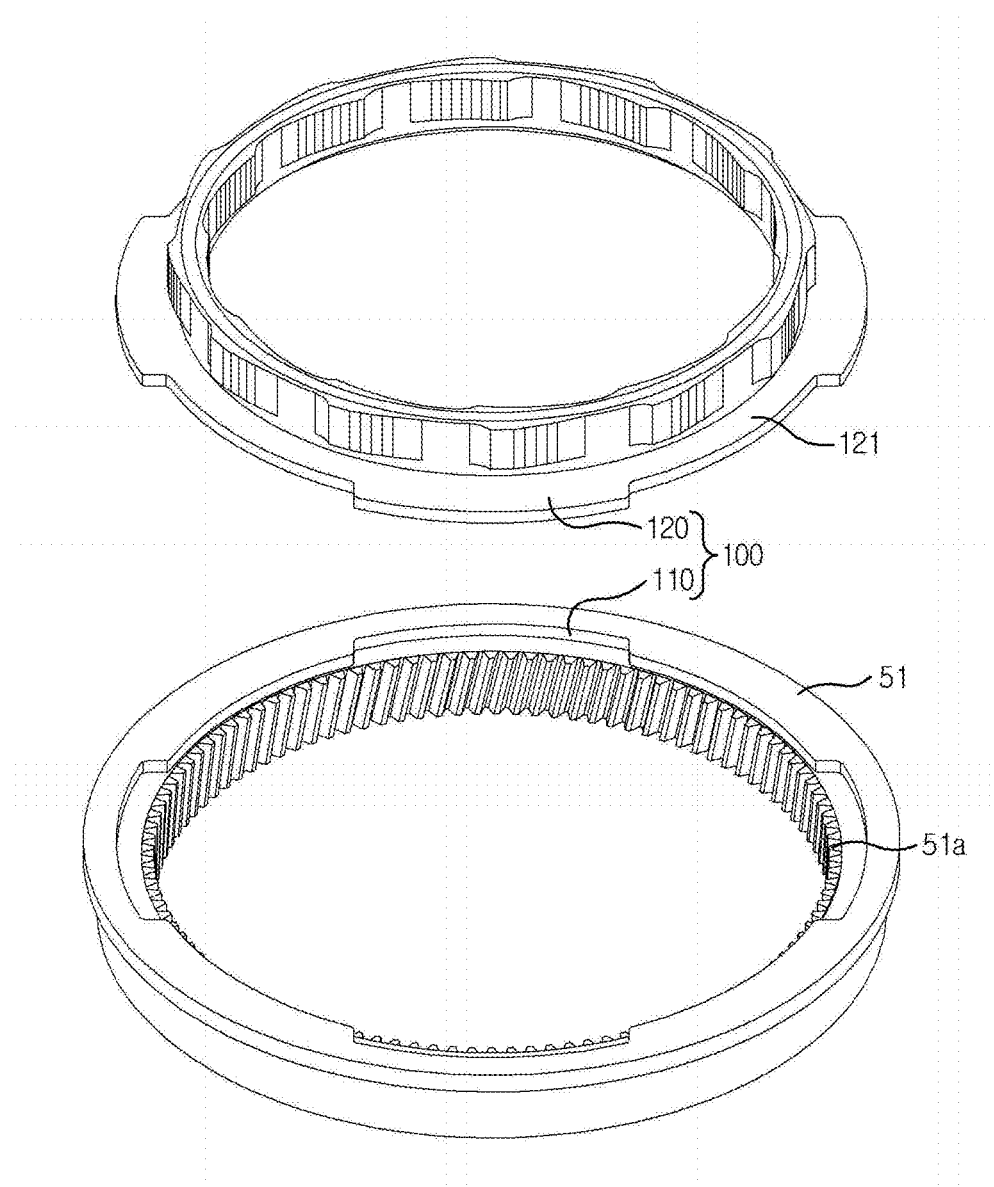
Figure 7:
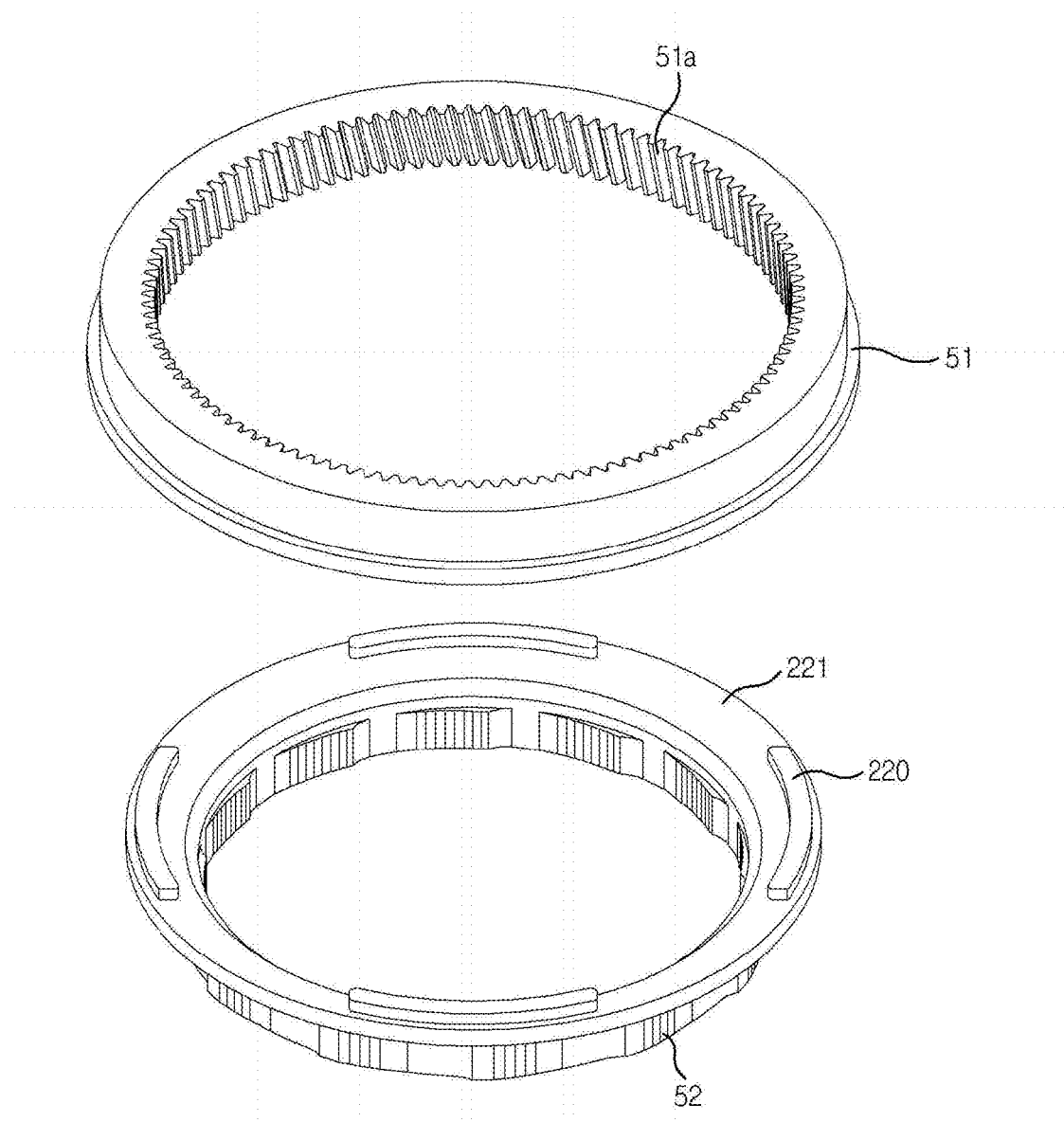
FIGS. 7 and 8 are exploded perspective views of ring gear according to a second exemplary embodiment of the present disclosure.
Figure 8:
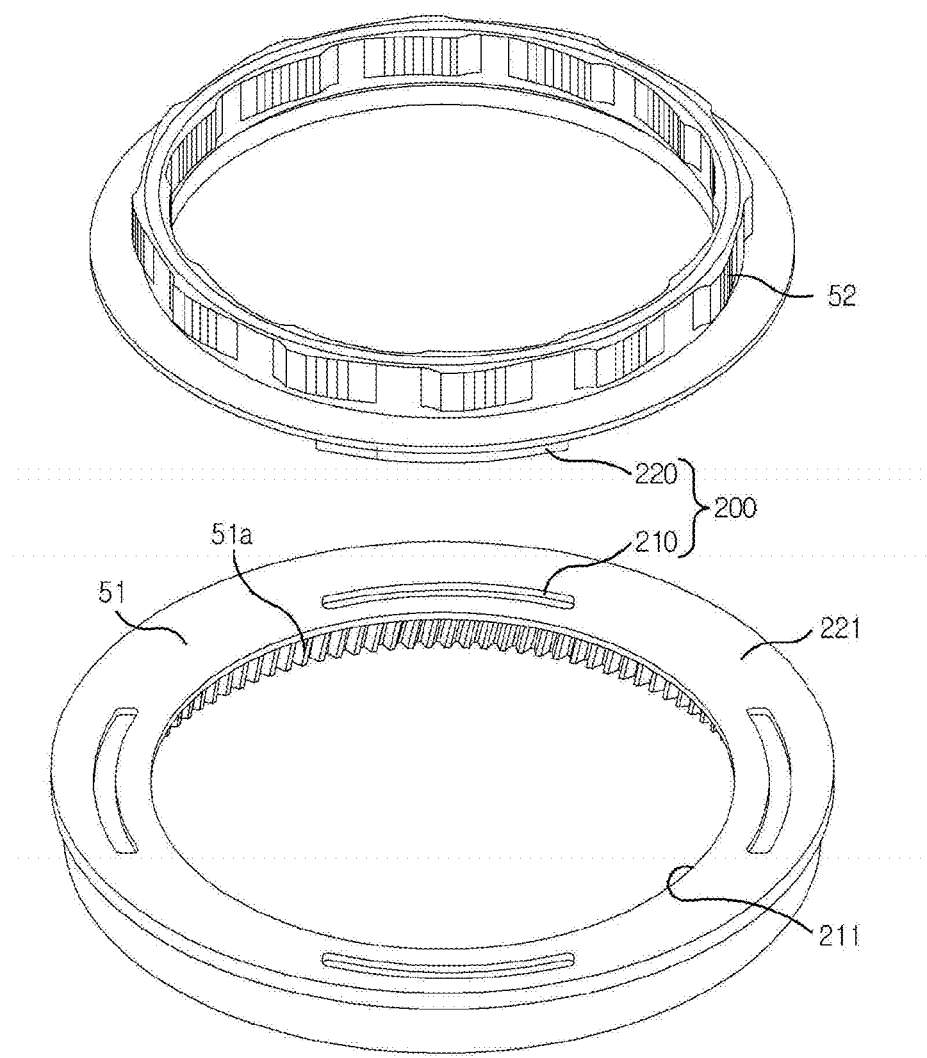

To this end, the ring gear (50), as depicted in FIGS. 5, 6, 7 and 8, is formed on a gear member (51) mounted at an inner circumferential surface of the gear surface (51a) and a surface opposite to the gear member (51), whereby a clutch member (52) operating in response to forward and backward rotation of the motor (20) can be formed in a separate part. The gear member (51) and the clutch member (52) are inseparably coupled by connection units (100, 200), such that a first exemplary embodiment illustrated in FIGS. 5 and 6, and a second exemplary embodiment illustrated in FIGS. 7 and 8 are divisibly explained based on configurations of the connection units (100, 200).

FIGS. 5 and 6 are exploded perspective views of ring gear formed by the connection unit (100) according to a first exemplary embodiment of the present disclosure.

Referring to FIGS. 5 and 6, the connection unit (100) includes a plurality of accommodation grooves (110) and an accommodation lug (120).

The accommodation groove (110) is formed at an inner circumferential surface of a surface opposite to the clutch member (52) of the gear member (51) at a predetermined depth. That is, the inner circumferential surface of the gear member (51) is bisected, where one section is formed with the gear surface (51 a) formed with a helical gear meshed with the planetary gear (40). Another section where the gear surface (51 a) is not formed is provided with a smooth cylindrical shape to allow the clutch member (52, described later) to be coupled. At this time, a surface opposite to the clutch member (52) forming a thickness of the gear member (51) is formed with the accommodation groove (110).

The accommodation lug (120) is formed in a shape corresponding to that of the accommodation groove (110), and it is preferable that the accommodation lug (120) is protrusively and circumferentially formed at a periphery of a portion connected to the gear member (51) of the clutch member (52). At this time, a distal end of the accommodation lug (120) is preferably shaped of an arc, as shown in the figures, not to protrude to a circumferential surface of the ring-shaped gear member (51) in the course of coupling.

Meanwhile, the accommodation lug (120) is protrusively formed at a periphery of a ring-shaped plate member (121) extensively formed at a circumferential direction of the clutch member (52). The accommodation grooves (110) and the accommodation lugs (120), each four, are provided, and inner angle of imaginary lines connected to a center of the ring gear (50) is preferably vertical. Of course, the number of accommodation grooves (110) and the accommodation lugs (120) are not limited to four, and three or more than four accommodation grooves (110) and the accommodation lugs (120) may be provided, if necessary. However, if less than three accommodation grooves (110) and the accommodation lugs (120) are provided, there may be a case where the press-fitted coupling between the accommodation grooves (110) and the accommodation lugs (120) are not tightly maintained, such that at least more than three accommodation grooves (110) and the accommodation lugs (120) are preferred.

Meanwhile, thickness of accommodation lug (120) is preferably corresponds to a depth of the accommodation groove (110). If thickness of accommodation lug (120) is greater than the depth of the accommodation groove (110), size of the ring gear (50) may increase excessively.

FIGS. 7 and 8 are exploded perspective views of ring gear (50) formed by the connection unit (200) according to a second exemplary embodiment of the present disclosure.

Referring to FIGS. 7 and 8, the connection unit (200) includes an insertion hole (210) and an insertion lug (220) protrusively formed at a plate member (221). The insertion hole (210) is penetratively formed at a ring-shaped support plate (211) protrusively formed toward a center from an inner circumferential surface of the gear member (50). A diameter of the support plate (211) preferably corresponds to that of the clutch member (52).

The insertion lug (220) is protrusively formed to an insertion direction at a surface opposite to the gear member (51) of the ring-shaped plate member (221) extensively formed to a circumferential direction of the clutch member (52).

Meanwhile, it is preferable that an outer diameter of the plate member (221) correspond to that of the support plate (211), and an inner diameter of the plate member (221) correspond to that of the support plate (221).

It is also preferable that four insertion holes (210) and four insertion lugs (220) be provided in the second exemplary embodiment of the present disclosure, and an angle formed by imaginary lines connected to a center of the ring gear (50) be perpendicularly arranged.

Furthermore, each shape of the insertion hole (210) and the insertion lug (220) may be variably formed, and as shown in FIGS. 7 and 8, each shape of the insertion hole (210) and the insertion lug (220) may be formed in an arc-shaped lug and groove. However, although not illustrated in FIGS. 7 and 8, each shape of the insertion hole (210) and the insertion lug (220) may be formed in a cylindrical boss and a cylindrical boss hole. That is, any coupling and supporting configuration is acceptable as long as insertion holes (210) and insertion lugs (220) can inhibit the gear member (51) and the clutch member (52) from idling.

Meanwhile, it is preferable that each of the connection units (100, 200) be provided in a complimentary shape to be fixed through press-fitting coupling, whereby no separate fastening member is needed to enable a prompt connection and fixture. As noted, if the gear member (51) and the clutch member (52) are configured in individual parts, it is possible to easily process the gear surface (51a) provided on the gear member (51) in the shape of a helical gear.

Furthermore, manufacturing in the shape of a helical gear can be possible using a cold forging process, a hot forging process as in the prior art, or a molding process which is cheaper manufacturing method. The material of ring gear (50) may be steel, plastic or sinter.

Thus, the transmission can be prolonged in life because of planetary gear (40) and the ring gear (50) configured in a helical gear longer in life but with less noise over the conventional spur gear, whereby manufacturing cost can be reduced. Furthermore, a lighter transmission can be provided over the conventional transmission due to the ring gear (50) being manufactured in plastic or sinter.

Meanwhile, the connection units (100, 200) according to the second exemplary embodiment of the present disclosure have been provided as an example, and any type of coupling is allowed as long as individually formed gear member (51) and the clutch member (52) are securely coupled by their own coupling. Now, a traction motor module according to the present disclosure will be described with reference to the accompanying drawings.

Referring to FIGS. 9 to 13, a traction motor module (400) includes a transmission further including a motor unit (1100), a hub unit (1200), a first transmission unit (1317) and a second transmission unit (1370), and a clutch (1320).

The motor unit (1100) includes a housing (1110), a stator (1120) and a rotor (1130). The housing (1110) includes a first housing (1112) and a second housing (1118) coupled to the first housing (1112).

The first housing (1112) takes a shape of a disk, and the second housing (1118) takes a shape of a cylinder opened at one side coupled to the first housing (1112). The first housing (1112) is fastened to the second housing (1118) using a bolt. The stator (1120) is accommodated along an inner circumferential surface of the second housing (1118).

The stator (1120) includes a core (1121) stacked with several steel plates of magnetic substance, and a coil (1122) wound on the core (1121). The rotor (1130) is inserted by a magnet (1132) opposite to the coil (1122). Reference numeral 50 is a fixing shaft coupled to the first housing (1112) to be supported to the frame of the e-bike. In the exemplary embodiment of the present disclosure, the fixing shaft (1050), the housing (1110) and the stator (1120) are fixed, while the rotor (1130) is rotated.

A fixing shaft bearing (1060) is rotatably connected to the fixing shaft (1050) to rotate the hub unit (1200), and includes a outer wheel (1061) and an inner wheel (1062) of the fixing shaft bearing (1060). The outer wheel (1061) of the fixing shaft bearing (1060) is secured to the hub unit (1200) while the inner wheel (1062) of the fixing shaft bearing (1060) is secured to a periphery of the fixing shaft (1050).

The fixing shaft (1050) is in a fixed state by being connected to the frame of the e-bike while the motor unit (1100) is driven, and the hub unit (1200) connected by spokes of the e-bike is connected to the transmission (1380) for rotation. To this end, the hub unit (1200) is secured to the outer wheel (1061) of the fixing shaft bearing (1060).

Meanwhile, the first housing (1112) coupled to the fixing shaft (1050) is coupled to a rotor bearing (1070) rotatably connecting to the rotor (1030). An outer wheel (1071) of the rotor bearing (1070) is secured to the first housing (1112), while an inner wheel of the rotor bearing (1070) is secured to a distal end of a rotation shaft (1131) of the rotor (1130). The rotor (1130) is rotated by electromagnetic force interacted between a coil (1122) and a magnet (1132) in a case a power is applied to the coil (1122).

The rotor (1130) includes the rotation shaft (1131) and the magnet (1132). The rotation shaft (1131) is a rotation center of the rotor (1130), and a distal end of the rotation shaft (1131) is inserted into an inner wheel (1072) of the rotor bearing (1070) and rotatably supported therein. The rotation shaft (1131) is coupled to a transmission (1380) to rotate the hub unit (1200) using a driving force generated by turning effect of the rotation shaft (1131) of the rotor (1130) at the motor unit (1100).

The hub unit (1200) encompasses the motor unit (1100), rotatably supports the motor unit (1100) and is rotated by using a power outputted from a transmission (1380, described later). The hub unit (1200) may take a barrel shape encompassing the motor unit (1100) and is rotatably supported by the fixing shaft bearing (1060). The transmission (1380) includes a first transmission unit (1317) and a second transmission unit (1370). The first transmission unit (1317) includes a sun gear (1310), a planetary gear (1312) and a first ring gear (1314).

The sun gear (1310) is coupled to the other distal end of the rotation shaft (1131) for transmitting a driving force of the motor unit (1100) to the planetary gear (1312). The sun gear (1310) is connected to a plurality of planetary gears (1312) in a circumscribed state, and the sun gears (1310) mesh with the planetary gears (1312) among the planetary gears (1312). Each of the planetary gears (1312) is connected to the first ring gear (1314) in an inscribed state, and mesh with the first ring gear (1314). The first ring gear (1314) is formed with a connection member (1314c) connected to a clutch (described later).

Each planetary gear (1312) is secured to the second housing (1110) by a pin (1316) formed at the second housing (1110). That is, the each planetary gear (1312) is rotatably fixed to the motor unit (1100).

In the exemplary embodiment of the present disclosure, the number of tooth profiles at the sun gear (1310) is smaller than that at the planetary gear (1312), and the number of tooth profiles at the planetary gear (1312) is smaller than that at the first ring gear (1314). An initial speed reduction is realized at the sun gear (1310), the planetary gear (1312) and the first ring gear (1314) according to the abovementioned number of tooth profiles.

The second transmission unit (1370) includes a second ring gear (1330), a first idle gear (1340), a second idle gear (1350) and a shaft (1360).

A secondary speed reduction by the second transmission unit (1370) is realized by a selective combination of the first ring gear (1314), the second ring gear (1330), the first idle gear (1340) and the second idle gear (1350). A first speed reduction ratio is constant while a second speed reduction ratio is variably adjusted, whereby the hub unit (1200) is a two-tier speed shifted in a low speed mode and a high speed mode.

The second ring gear (1330) includes a low speed ring gear (1332) and a high speed ring gear (1334). The low speed ring gear (1332) is formed with a first diameter, and the high speed ring gear (1334) is integrally formed with the low speed ring gear (1332) at a bottom surface of the low speed ring gear (1332). The high speed ring gear (1334) is formed with a second diameter smaller than the first diameter.

The number of tooth profiles of low speed ring gear (1332) is smaller than that of the high speed ring gear (1334), such that in a case a power generated by the rotation shaft (1131) is transmitted to the low speed ring gear (1332), the hub unit (1200) is rotated at a low speed, and in a case the power generated by the rotation shaft (1131) is transmitted to the high speed ring gear (1334), the hub unit (1200) is rotated at a high speed.

The first idle gear (1340) is rotatably coupled to the shaft (1360) and coupled to a second clutch (1322) of clutch (1320, described later), and the second idle gear (1350) is coupled to the first idle gear (1340) and meshed with the high speed ring gear (1334). The shaft (1360) rotatably supports the first and second idle gears (1340, 1350) and so guides as not to allow being disengaged to an axial direction.

The shaft (1360) is not rotated when the hub unit (1200) is rotated, and the state of the shaft (1360) not rotating is indicated as reference numeral 'F'.

Figure 11:
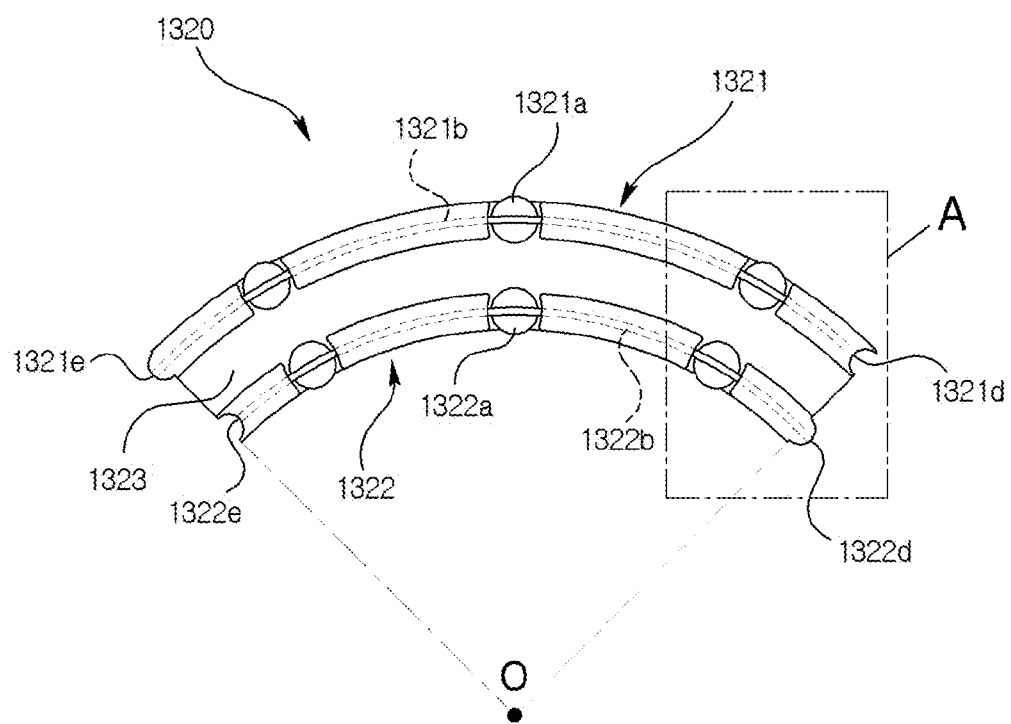
FIG. 11 is a plan view illustrating a clutch of a traction motor module illustrated in FIG. 9.
Figure 12:
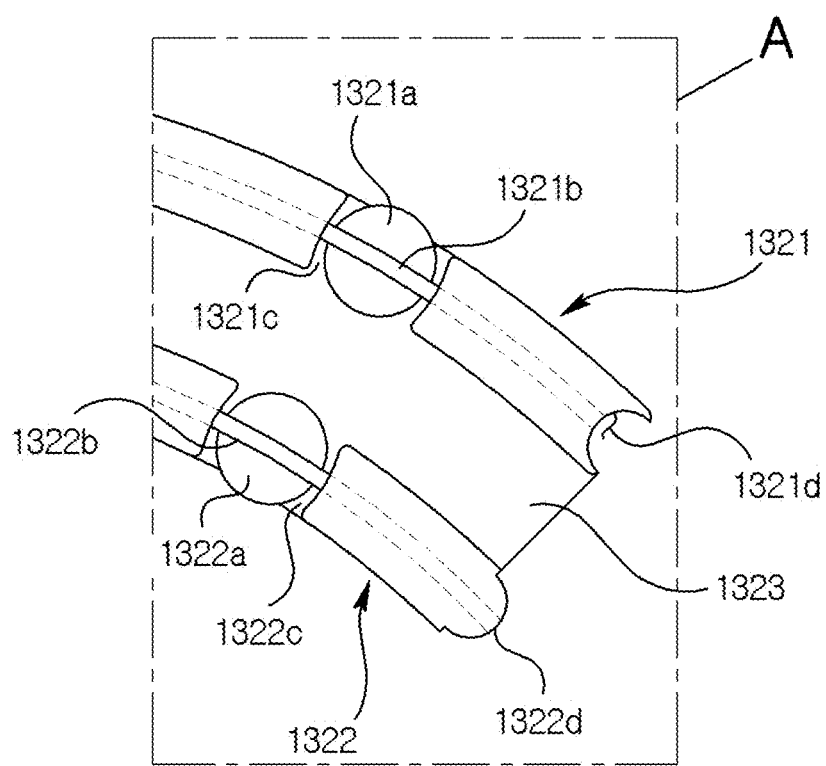
FIG. 12 is an enlarged view of 'A' part of FIG. 11.

The first and second transmission units (1317, 1370) are respectively connected to the clutch (1320). Referring to FIGS. 11 and 12, the clutch (1320) includes a first clutch (1321) and a second clutch (1322). In the exemplary embodiment of the present disclosure, the clutch (1320) may be formed with a metal member or synthetic resin member.

The first clutch (1321) and the second clutch (1322) are oppositely arranged to the first ring gear (1314), formed in a curved plate shape facing the first ring gear, and interconnected by a floor plate (1323).

The first clutch (1321) is formed in an arc shape with a 90° of angle from a rotation center (O) of the first ring gear (1314), for example. That is, the first clutch (1321) is shorter than a circumferential length of the first ring gear (1314), and the number of assembly parts and assembly processes, and manufacturing cost can be greatly reduced by forming the first clutch (1321) shorter than a circumferential length of the first ring gear (1314). The first clutch (1321) is coupled to at least one portion of the first ring gear (1314) and a length of curved surface of the first clutch (1321) is shorter than that of the first ring gear (1314).

In the exemplary embodiment of the present disclosure, the arc-shaped first clutch (1321) is formed with three pin holes (1321c), for example, where each pin hole (1321c) is arranged with a first power transmission pin (1321a). The pin hole (1321c) is so shaped as to inhibit the first power transmission pin (1321a) from being disengaged, and a portion of the first power transmission pin (1321a) is protruded from inner and outer lateral surfaces of the first clutch (1321).

Furthermore, the first clutch (1321) includes a curvature-shaped pin stopper (1321b) for inhibiting the first power transmission pin (1321a) coupled to the first clutch (1321) from being disengaged upwards of the first clutch (1321).

The second clutch (1322) is formed in an arc shape with a 90° of angle from a rotation center (O) of the first ring gear (1314), for example. That is, the second clutch (1322) is shorter than a circumferential length of the first ring gear (1314), and the number of assembly parts and assembly processes, and manufacturing cost can be greatly reduced by forming the second clutch (1322) shorter than a circumferential length of the first ring gear (1314). In the exemplary embodiment of the present disclosure, the length of the second clutch (1322) is a bit shorter than that of the first clutch (1321).

In the exemplary embodiment of the present disclosure, the arc-shaped second clutch (1322) is formed with three pin holes (1322c), for example, where each pin hole (1322c) is arranged with a second power transmission pin (1322a). The pin hole (1322c) is so shaped as to inhibit the second power transmission pin (1322a) from being disengaged, and a portion of the second power transmission pin (1322a) is protruded from inner and outer lateral surfaces of the second clutch (1322). The second clutch (1322) is coupled to at least one portion of the first idle gear (1340) and the length of the second clutch (1322) is shorter than a circumferential length of the first ring gear (1314).

Furthermore, the second clutch (1322) includes a curvature-shaped pin stopper (1322b) for inhibiting the second power transmission pin (1322a) coupled to the second clutch (1322) from being disengaged upwards of the second clutch (1322).

Figure 13:
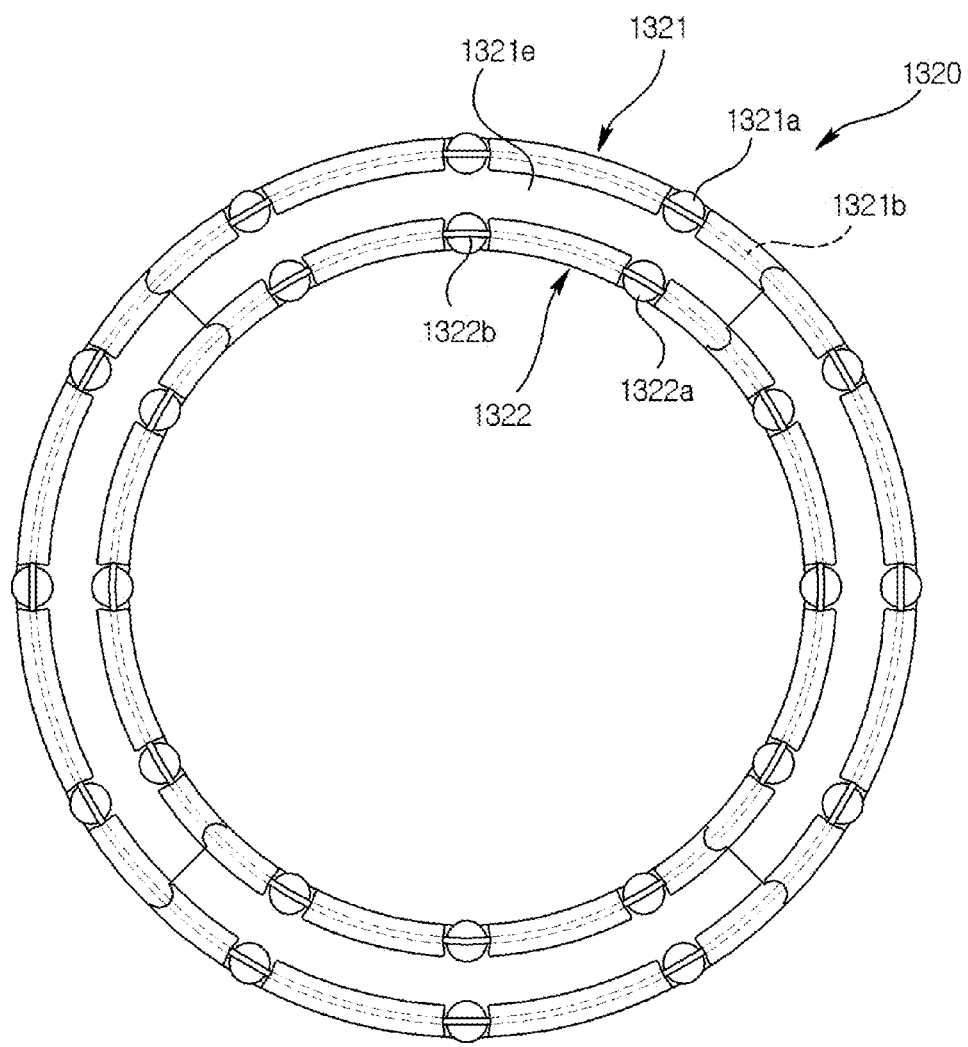
FIG. 13 is a plan view illustrating a clutch of FIG. 11 assembled in a circle.

In the exemplary embodiment of the present disclosure, at least two clutches in FIG. 3 may be inter-coupled in series, and as shown in FIG. 13, four clutches (1320) may be coupled in a circle.

A distal end of one side of the first clutch (1321) is formed with a coupling groove (1321d) to allow at least two clutches (1320) to be inter-coupled in series, and the other distal end opposite to the distal end of the first clutch (1321) may be formed with a coupling lug (1321e).

Furthermore, a distal end opposite to the distal end of the one side of the first clutch (1321) in the second clutch (1322) may be formed with a coupling lug (1322d), and the other distal end opposite to the distal end of the second clutch (1322) may be formed with a coupling groove (1322e).

Although the exemplary embodiment of the present disclosure has described a ratchet-and-pawl technology in which the connection member (1314c) and the clutch (1320) are mutually contacted to transfer a power to one direction only and idle to the other direction, the connection member (1314c) of the first ring gear (1314) and the clutch (1320) may be meshed in a gear type, or the connection member (1314c) of the first ring gear (1314) and the clutch (1320) may be mutually contacted in a friction wheel type, as an exemplary embodiment for transferring a driving power of the rotation shaft (1131) to the transmission (1380).

The first and second clutches (1321, 1322) of the clutch (1320) may increase or decrease revolution of the hub unit (1200) in response to clockwise (CW) and counterclockwise (CCW) rotations of the rotation shaft (1131) of the motor unit (1100).

Hereinafter, the rotation of forward direction of the motor unit (1100) is defined as rotating in any one direction of clockwise (CW) direction and counterclockwise (CCW) direction, and the rotation of backward direction of the motor unit (1100) is defined as rotating in a direction opposite to the forward direction.

For example, as shown in FIG. 1, the first ring gear (1134) is rotated CCW direction in a case the rotation shaft (1131) of the rotor (1130) and the sun gear (1310) rotate CW direction, whereby the connection member (1314c) and the first power transmission pin (1321a) of the first clutch (1321) are mutually fastened (ON) to allow the power of the motor unit (1100) to be directly transferred to the low speed ring gear (1332) of the second ring gear (1330) via the first ring gear (1314).

As a result, the low speed ring gear (132) of the second ring gear (1330) meshed with the first clutch (1321) is rotated to CCW direction which is the same direction as that of the first ring gear (1314), whereby the second ring gear (1330) is rotated at a low speed mode. At this time, the CCW direction low rotation speed of the second ring gear (1330) is indicated as first speed (CCW 1). The hub unit (1200) coupled to the second ring gear (1330) is also rotated at the first speed (CCW 1) which is the same rotation direction and speed of the second ring gear (1330).

At this time, although the second clutch (1322) of the clutch (1320) corresponds to the first idle gear (1340), the coupling between the second clutch (1322) and the first idle gear (1340) is turned off (OFF) in response to operational characteristic of the clutch (1320) to inhibit the power transfer of the second clutch (1322) from being realized to the first idle gear (1340).

As a result, the first idle gear (1340) is in a stop state or idle in response to mesh between the second ring gear (1330) and the second idle gear (1350). In a case the first idle gear (1340) idles, the first idle gear (1340) may rotate to a CCW direction which is the same direction of the first ring gear (1314) rotating to the CCW direction.

Meanwhile, as illustrated in FIG. 2, the rotor (1130) and the sun gear (1310) are rotated to a CCW direction, whereby, in a case the first ring gear (1314) is rotated to a CW direction, the coupling between the connection member (1314c) of the first ring gear (1314) and the first clutch (1321) is turned off (OFF) to inhibit the power transfer of the motor unit (1100) from being realized to the second ring gear (1330) via the first ring gear (1314).

At this time, the second clutch (1322) of the clutch (1320) is turned on (ON) in a coupling relationship with the first idle gear (1340), a power transfer is realized to the first idle gear (1340) from the second clutch (1322) in response to operational characteristic of the clutch (1320).

As a result, the first idle gear (1340) is rotated to a CW direction, and the second idle gear (1350) circumferentially meshed with the first idle gear (1340) is rotated to a CCW direction to allow the high speed ring gear (1334) of the second ring gear (1330) circumferentially meshed with the second idle gear (1350) to rotate CCW direction.

At this time, a radius of a meshed surface between the second idle gear (1350) and the high speed ring gear (1334) of the second ring gear (1330) is smaller than that of a meshed surface between the first clutch (1321) of the first ring gear (1314) and the low speed ring gear (1332) of the second ring gear (1330), such that the second ring gear (1330) is rotated to a CCW direction under a high speed mode, which is indicated as a second speed (CCW 2). The hub unit (1200) coupled to the second ring gear (1330) is also rotated at a high speed of second speed (CCW 2), which is the same rotation direction and speed as those of the second ring gear (1330).

Figure 9:
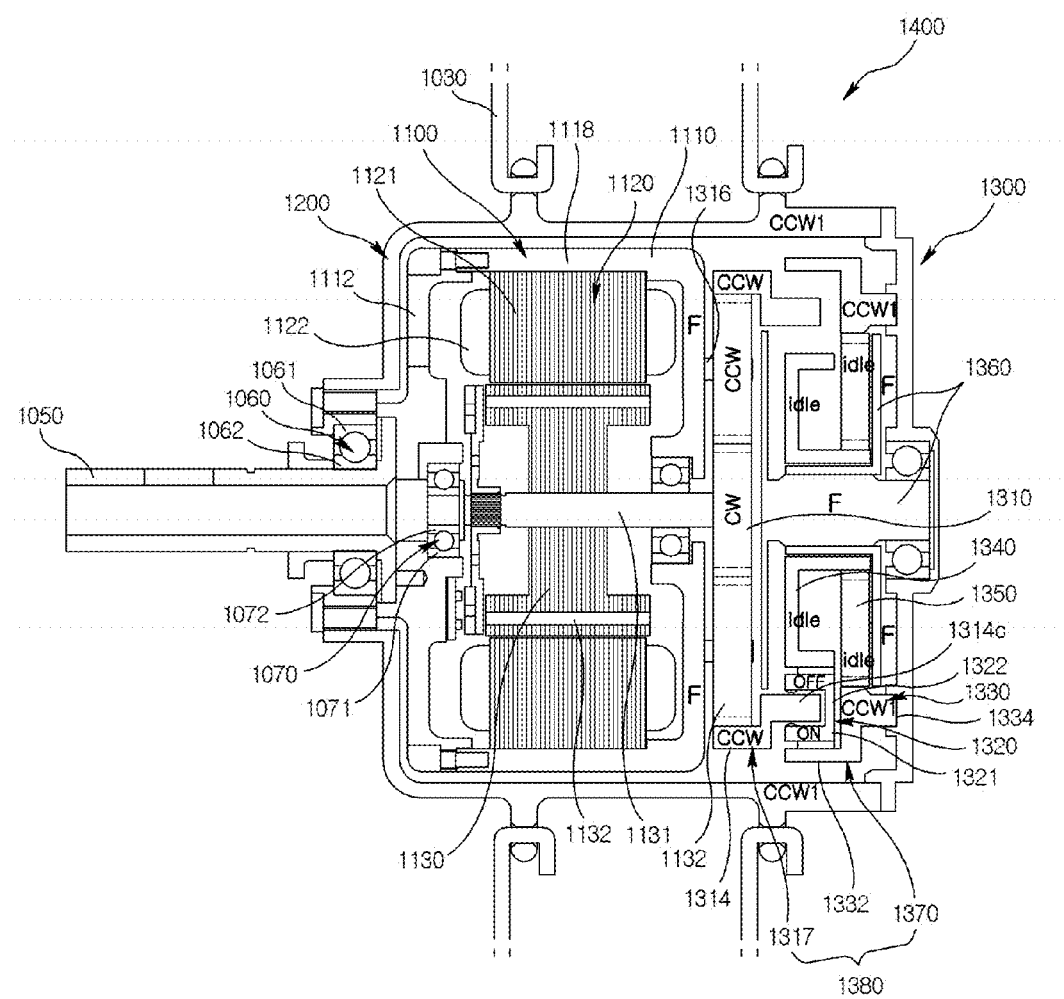
FIG. 9 is a cross-sectional view illustrating a rotation shaft of a traction motor module rotating in the forward direction according to an exemplary embodiment of the present disclosure.

As depicted in FIG. 9, in a case of high speed mode which has a low gear ratio, the hub unit (1200) has a rotation direction and speed of the first speed (CCW 1) which is CCW low speed, in a case the rotation shaft (1131) of the motor unit (1100) is rotated to a CW direction.

Figure 10:
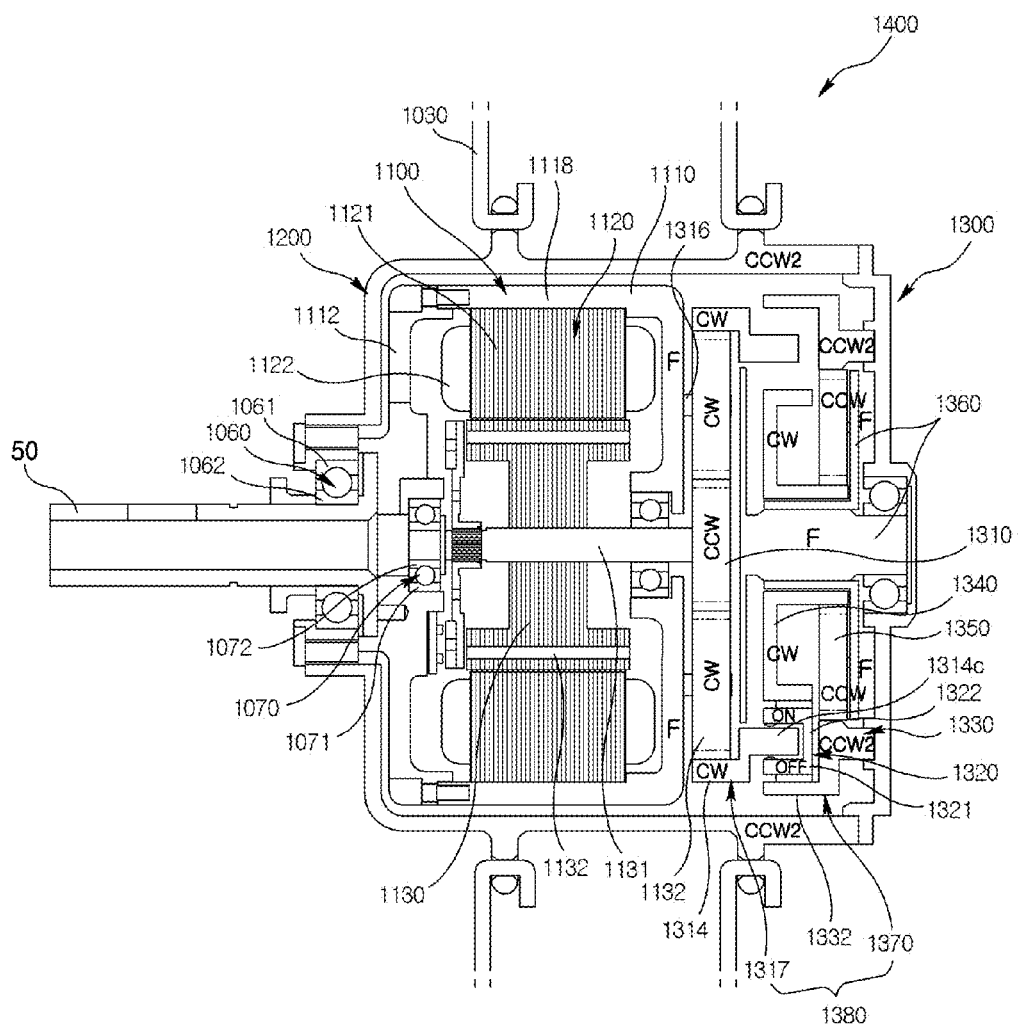
FIG. 10 is cross-sectional view illustrating a rotation shaft of a fraction motor module rotating in the backward direction according to an exemplary embodiment of the present disclosure.

As illustrated in FIG. 10, in a case of low speed mode which has a high gear ratio, the hub unit (1200) has a rotation direction and speed of the second speed (CCW 2) which is CCW high speed, in a case the rotation shaft (1131) of the motor unit (1100) is rotated to a CCW direction.

As apparent from the foregoing, the transmission and traction motor unit according to the present disclosure has an industrial applicability in that a clutch included in a transmission changing a rotation speed of a hub unit is changed to an arc shape from a circular band shape to reduce the number of power transmission pins, which is one constituent part of the clutch and to reduce lengths of first and second clutches supporting a power transmission pin, whereby the number of assembly parts in the clutch and the number of assembly processes can be reduced to greatly reduce the manufacturing cost.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A transmission of an e-bike motor, the transmission comprising:
   a plurality of planetary gears meshed with a sun gear transmitting a power of a rotation shaft of a motor;
   a ring gear including a gear member meshed with an inner circumferential surface of the planetary gears and a clutch member formed at the other end of the gear member to shift a direction of power in response to backward and forward rotations, where the gear member and the clutch member are individual parts; and
   a connection unit connecting the gear member and the clutch member lest the gear member and the clutch member idle relative to an axial direction,
   wherein the plurality of planetary gears and the gear member of ring gear are provided in helical gears.

2. The transmission of an e-bike motor of claim 1, wherein the connection unit includes a plurality of accommodation grooves formed at an inner circumferential surface of a connector of the clutch member at the gear member; and
   accommodation lugs circumferentially and protrusively formed at a periphery of a connector of the gear member at the clutch member to be coupled to the accommodation grooves,
   wherein the accommodation grooves and the accommodation lugs are press-fitted.

3. The transmission of an e-bike motor of claim 2, wherein accommodation lug is protrusively formed at a periphery of a ring-shaped plate member extensively formed to a circumferential direction of the clutch member.

4. The transmission of an e-bike motor of claim 2, wherein the accommodation grooves and the accommodation lugs are such that inner angles of imaginary lines connected to a center of the ring gear are perpendicularly arranged.

5. The transmission of an e-bike motor of claim 1, wherein the connection unit includes a ring-shaped support plate member extensively formed on an inner circumferential surface of the connector of the clutch member at the gear member to have a diameter corresponding to that of an inner diameter of the clutch member, insertion holes penetratively formed at the support plate, a plurality of insertion lugs integrally formed at the clutch member to be insertedly coupled to the insertion hole, wherein the insertion holes and the insertion lugs are coupled by press-fitting method.

6. The transmission of an e-bike motor of claim 5, wherein the insertion lug is protrusively formed to an insertion direction on a surface opposite to the gear member of the ring-shaped plate member extensively formed to a circumferential direction of the clutch member.

7. The transmission of an e-bike motor of claim 6, wherein the support plate member and the plate member are surface-contacted to each other.

8. The transmission of an e-bike motor of claim 5, wherein the insertion holes and the insertion lugs are such that inner angles of imaginary lines connected to a center of the ring gear are perpendicularly arranged.

9. The transmission of an e-bike motor of claim 1, wherein the ring gear is formed by any one of steel, plastic and sinter.

10. A traction motor module, the module comprising:
    a motor unit including a rotation shaft rotating forward and backward;
    a hub unit encompassing the motor unit and rotating relative to the motor unit;
    a first transmission unit including a first ring gear rotated by a power transmitted by the rotation shaft;
    a second transmission unit secured to the hub unit and including a second ring gear further including a low speed ring gear and a high speed ring gear; and
    a clutch including the first ring gear rotating in a forward direction, a first clutch connecting the first ring gear and the low speed ring gear, and a second clutch connecting the first ring gear and the high speed ring gear through a backward rotation,
    wherein the clutch is formed with a length shorter than circumferential lengths of the first and second ring gears.

11. The traction motor module of claim 10, wherein the clutch is formed in the shape of an arc based on each center of the first and second ring gears, when viewed in a top plan view.

12. The traction motor module of claim 11, wherein the clutch is formed with a 90° of angle when viewed in a top plan view.

13. The traction motor module of claim 10, wherein at least two clutches are coupled in series.

14. The traction motor module of claim 13, wherein a coupling groove is formed at each lateral surface of first and second clutches, and the other lateral surface opposite to the each lateral surface of the first and second clutches is formed with a lug coupled to the coupling groove.

15. The fraction motor module of claim 10, wherein each of the first and second clutches includes a curved lateral plate having a same curvature, a pin fixing hole formed at each lateral plate, a power transmission pin inserted into the pin fixing hole and a pin stopper inhibiting the power transmission pin from separating.

16. The traction motor module of claim 15, wherein three power transmission pins are formed at the lateral plate.

17. The traction motor module of claim 10, wherein the first transmission unit includes a sun gear coupled to the rotation shaft, a plurality of planetary gears coupled to the sun gear and inscribed to the first ring gear, and a connection member formed at the first ring gear and connected to the clutch.

18. The traction motor module of claim 10, wherein the low speed ring gear of the second transmission unit is formed with a first diameter, and the high speed ring gear is formed with a second diameter smaller than the first diameter, and the second transmission unit includes a first idle gear coupled to the first clutch, a second idle gear coupled to the first idle gear and the high speed ring gear, and an axle inserted by the first and second idle gears.

* * * * *